United States Patent [19]

Moran

[11] Patent Number: 5,014,901
[45] Date of Patent: May 14, 1991

[54] ROTATABLE WELDING FIXTURE AND METHOD FOR METAL CLADDING TUBULAR MEMBRANE PANELS

[75] Inventor: Edward Moran, St. Catharines, Canada

[73] Assignee: Foster Wheeler Energy Corporation, Clinton, N.J.

[21] Appl. No.: 371,171

[22] Filed: Jun. 26, 1989

[51] Int. Cl.$^5$ .................................................. B23K 9/04
[52] U.S. Cl. ...................................... 228/119; 228/48; 228/183; 228/222
[58] Field of Search .................. 228/119, 183, 222, 48, 228/212, 49.1, 49.2; 269/58, 59

[56] References Cited

U.S. PATENT DOCUMENTS

| | | | |
|---|---|---|---|
| 3,248,790 | 5/1966 | Galloway | 228/212 X |
| 3,357,083 | 12/1967 | Wiehn et al. | 228/183 X |
| 4,611,751 | 9/1986 | Luckow et al. | 228/48 X |
| 4,637,540 | 1/1987 | Fujita et al. | 228/49.2 |
| 4,828,161 | 5/1989 | Million | 228/222 X |

Primary Examiner—Kenneth J. Ramsey
Attorney, Agent, or Firm—Marvin A. Naigur

[57] ABSTRACT

A rotatable welding fixture for supporting elongated structures such as tubes while performing metal welding operations on the tubes. The fixture includes an elongated central rigid frame which is rigidly attached at each end to an end plate and a trunnion aligned with the longitudinal axis of the frame. The central frame can be conveniently formed by a plurality of adjacent tubes each having a rectangular cross-sectional shape. A plurality of elongated structures such as tubes to be metal clad welded are supportably attached to the outer longitudinal surfaces of the fixture. The tubes being welded can be advantageously cooled during welding by passing a fluid such as water through the tubes. The invention also provides a method for metal clad welding the elongated structures while being rigidly supported by the rotatable welding fixture.

16 Claims, 3 Drawing Sheets

ROTATABLE WELDING FIXTURE AND METHOD FOR METAL CLADDING TUBULAR MEMBRANE PANELS

BACKGROUND OF INVENTION

This invention pertains to a welding fixture for supporting elongated structures such as tubes during welding of the structures. It pertains particularly to such a welding fixture for supporting elongated tubes while depositing weld metal over the whole exposed face surface of the tubes, and to a method of producing undistorted metal clad tubular panels.

In municipal solid waste (garbage burning) boilers, the combination of high temperatures above 1000 degrees F, high gas velocity and an extremely erosive and corrosive environment causes boiler tubes to wear very rapidly. Consequently, repairs or replacement of such boiler tubes is the most costly problem facing the municipal solid waste boiler industry today. In addition, the lengthy boiler downtime, lost service and lost revenue caused by such repairs cannot be tolerated. These problems are caused by boiler tube corrosion and erosion produced by burning municipal garbage. The present technical solution to this problem is to completely cover the boiler tubes in the furnace area with an anti-erosive and anti-corrosion metal cladding material such as Inconel 625, which is deposited on the tubes by manual welding in place using the gas metal arc process.

However, a major quality concern for such metal clad welding of boiler tubes is that the heat input is high and it produces severe warpage, inconsistent stresses, and poor welds due to the extremely difficult positions and the inability to maintain a uniform weld deposition thickness on the surface being clad welded. Although the prior art such as U.S. Pat. Nos. 3,596,041 to Frusi et al and 3,895,209 to Moriki et al has disclosed some arrangements for depositing weld metal on rotary machine elements, they do not disclose procedures for preventing distortions in welding elongated relatively thin elements by having the elements rigidly supported by a central rigid rotatable welding fixture. These welding problems are advantageously overcome by this invention, which provides a special welding fixture and a method for accomplishing the needed weld metal cladding of elongated structures such as tubes while being rigidly supported by the welding fixture.

SUMMARY OF INVENTION

The present invention provides a rotatable welding fixture which is adapted for supporting elongated structures such as tubes, while weld clad metal is deposited in parallel rows over the exposed outer surface of the elongated structures. The welding fixture includes a rigid central framework, which can have planar or curvilinear outer surface. The central framework can be formed of various shaped fabricated structures such as flat or curved plates, and is preferably provided by a plurality of adjacent parallel rectangular-shaped tubes rigidly attached together. The fixture includes an end plate and trunnion rigidly attached on to each extreme end, with the trunnions being longitudinally aligned with each other. The trunnions are preferably mounted on a set of variable speed turning rotators, thereby allowing the welding fixture and tubular panel rigidly mounted thereon to be rotated 360 degrees about its longitudinal axis to facilitate welding operations to be performed on the panel. The tubular surfaces to be metal clad by welding are located around the welding fixture, and are structurally supported by the fixture. Because the welding or metal cladding fixture and tube panel can be rotated 360 degrees about its longitudinal axis, it thereby permits all welding to be accomplished on the fixture upper side and in the "down hand" position, allows sequential deposits of weld metal, and allows access to previously inaccessible areas for welding operations. The elongated tubes are cooled during welding operations by a coolant such as water at a temperature of 45 - 65 degrees F being passed through the tubes to carry away excess heat from the tubes during the welding operation.

The tubular outer surfaces are metal clad to produce a boiler membrane wall panel, which is preferably manufactured in four pieces which are wrapped around the elongated welding fixture and welded to each other, thus making in effect a rectangular-shaped elongated tubular panel structure. This panel side elements can be later cut away from the welding fixture and rejoined together so as to provide a single flat tubular membrane panel having a width equal to the perimeter of the welding fixture.

Plugs are inserted in to opposite ends of each tube to be welded, and the plugs are connected to a coolant supply to provide a continuous flow of coolant through the whole tubular structure for carrying away excess heat and reduce distortions produced during welding. The combination of cooling, optimum sequential welding pattern, and being able to perform every weld pass in the flat upper position reduces the heat input from approximately 28,000 joules per linear inch of weld to less than 5,000 joules per inch. The resulting weld cladding profile shape is greatly improved, less cladding material (which is extremely expensive) is used, and boiler tube corrosion protection is significantly improved and optimized.

The invention also includes a method for sequentially metal cladding elongated structures such as tubes and tubular panels by welding with minimal distortion of the structure due to the welding. In this method, rather than initially making a single wide panel, it instead makes four narrower panels which are placed around the perimeter of the rectangular-shaped fixture, then the panels are welded longitudinally to each other. Thus in effect, a membrane panel has been wrapped around the rectangular frame in a closed loop. The stresses which cause bowing and shrinkage in the former flat fixture method now act against and cancel each other in the closed loop method of fabrication. The panel structure being clad is captured on the fixture and is not able to shrink to a dimension less than the confines of the fixture frame, the perimeter of which equals the finished total width of the panel structure.

The stresses that are exerted on the welded panel shrink it until the panel is located tightly against the central frame, and tightens the panel progressively to the point where the tubes deform slightly, i.e. flatten. As the tubes flatten, the panel increases slightly in width, thus compensating for the shrinkage, so the completed panel width is the same as the perimeter of the fixture. Hence the finished panel dimensions can be determined and comply with design criteria. This phenomenon can not be accomplished by any present known means.

This invention also provides for the optimum use of sequential clad welding of elongated structures such as tubular panels. This procedure reduces localized heat concentration, which in turn reduces stresses and resulting shrinkage, and provides uniform weld deposition, reduces expensive consumable weld cladding materials, and enhances the clad surface profile.

BRIEF DESCRIPTION OF DRAWINGS

This invention is described by reference to the following drawings, in which.

DESCRIPTION OF INVENTION

Figure 1:
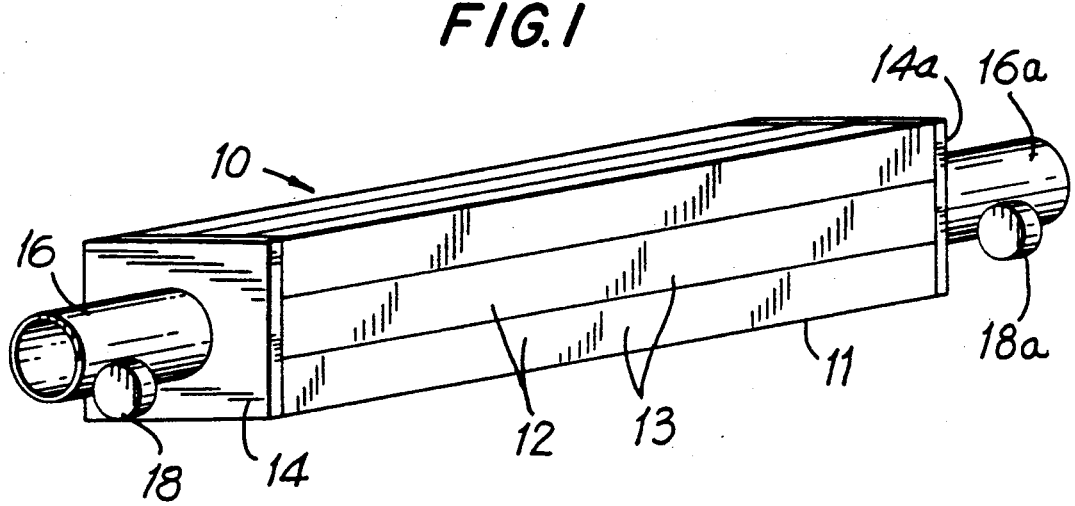
FIG. 1 shows a perspective view of an elongated rigid welding fixture having a trunnion at each end for rotation of the fixture about its longitudinal axis or centerline.

As shown in FIG. 1, an elongated welding fixture 10 has a rigid central core or frame 11, which is preferably made up of a plurality of elongated tubes 12 having rectangular or square-shaped cross-sectional shape. The tubes 12 are rigidly attached to each other by welding so as to form a rigid central frame. The central frame 11 is attached such as by welding at each end to a substantially flat end plate 14 and 14a, with each end plate substantially covering an end of the frame 11. A cylindrical-shaped trunnion 16, 16a is attached such as by welding to the outer surface of each end plate 14, 14a, respectively and the trunnions are longitudinally aligned with the central axis of the frame 11. The trunnions 16, 16a are rotatably supported at each end usually by dual powered rollers 18,18a.

Figure 3:
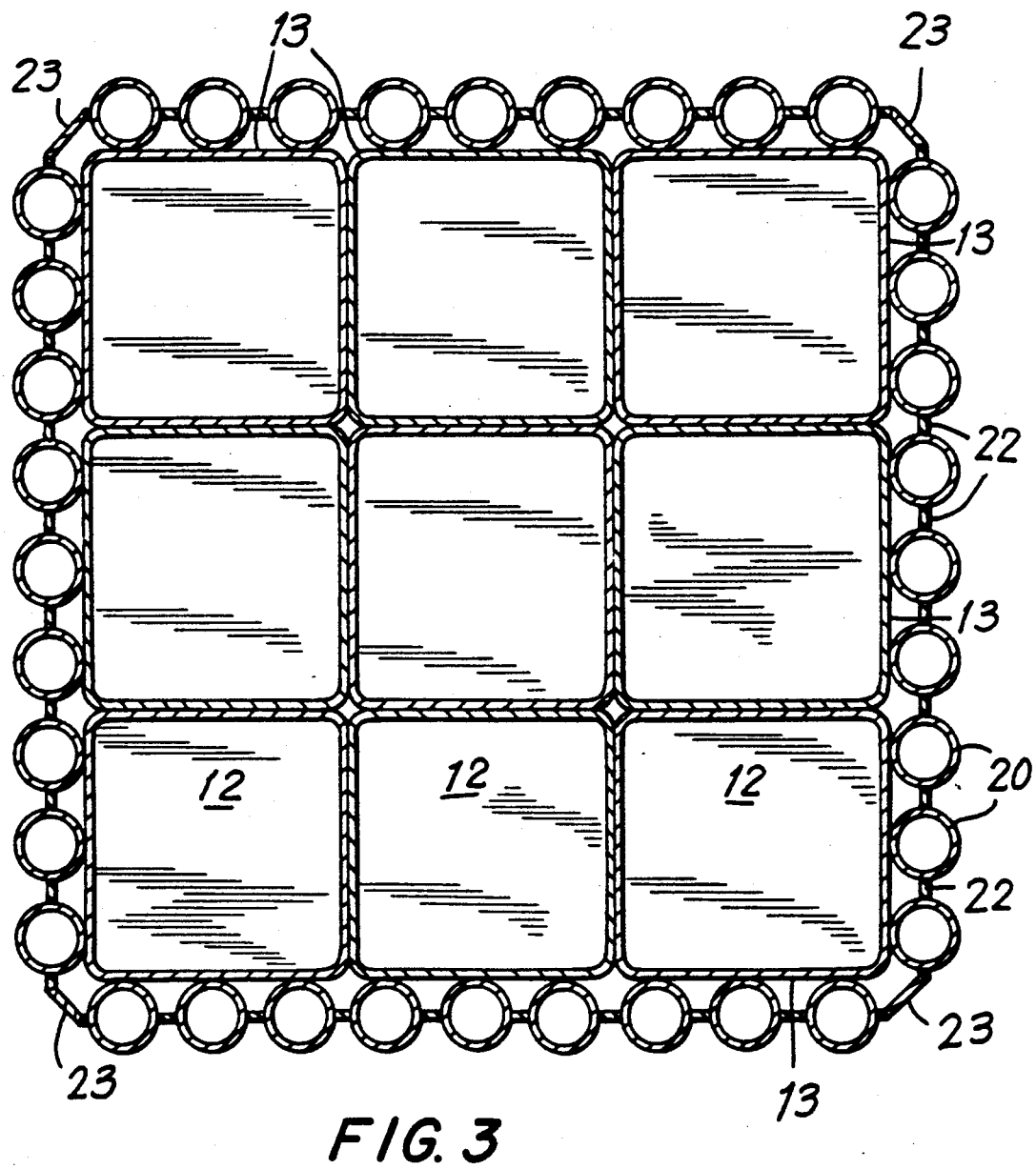
FIG. 3 shows a cross-sectional view of the welding fixture and tubular panels taken at section 3—3 of FIG. 2.

The rectangular-shaped central tubes 12 are provided in numbers of at least 2 and up to 16 tubes, so as to provide at least two substantially flat surfaces 13 for supporting a plurality of surrounding elongated structures such as tubes on which metal clad welding operations are to be performed. As shown in FIG. 3, nine support tubes 12 each having a square cross-sectional shape and flat outer surfaces 13 can be preferably utilized for the central rigid frame 11.

Figure 2:
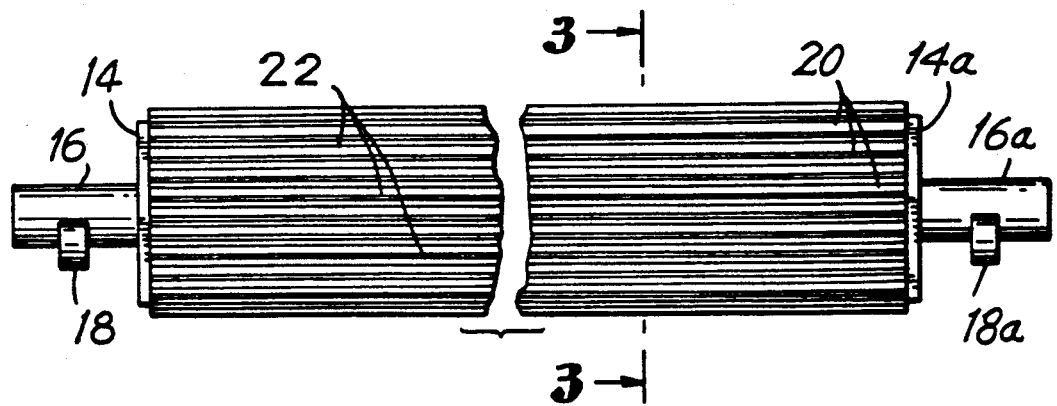
FIG. 2 shows an elevation view of the fixture of FIG. 1 covered by a tubular panel of adjacent parallel tubes, which are metal clad by metal arc welding a corrosion-resistant cladding metal onto the panel outer surface.

As shown in FIG. 2, a plurality of elongated adjacent parallel tubes 20 are provided mounted onto the outer surfaces 13 of the central core frame 11 of the fixture 10. The tubes 20 each lay against and are rigidly supported by one or more of the central core tubes 12. The adjacent tubes 20 are usually connected together by longitudinal fins 22 attached to each tube 20. The outer surface of each of the tubes 20 and fins 22 is metal coated or clad by a welding operation.

As best shown by FIG. 3, the core framework 11 is preferably formed by nine square-shaped tubes 12, and each side of core framework 11 is covered by 9 elongated parallel finned heat exchange tubes 20, with each tube having two longitudinal fins 22. Each fin 22 is welded to the adjacent fin to provide a planar panel wall or membrane. Four panel membranes are provided, one on each side of the welding fixture frame 11 and connected together temporarily by connecting plates 23. The outer surface of the tubes 20 and fins 22 are metal clad by welding in a specific sequence, so as to minimize any excessive heating and distortion of the tubes 20. Specifically, during the metal cladding operation, 1–3 adjacent tubes on the upper side of the welding fixture 11 are clad welded, after which the fixture is rotated about its longitudinal axis by trunnions 16, 16a so that another side of the fixture is turned upward, and the clad welding operation is repeated.

Figure 4:
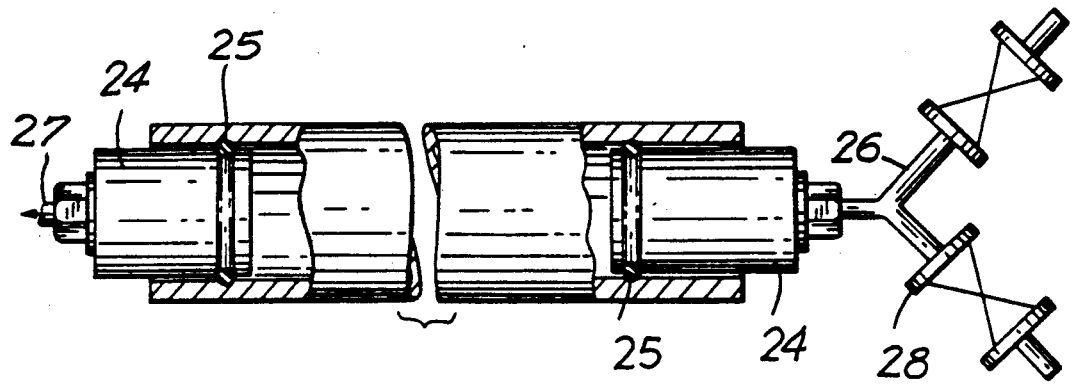
FIG. 4 shows a diagram of an arrangement for passing a cooling liquid through etch tube during clad welding operations.
Figure 5:
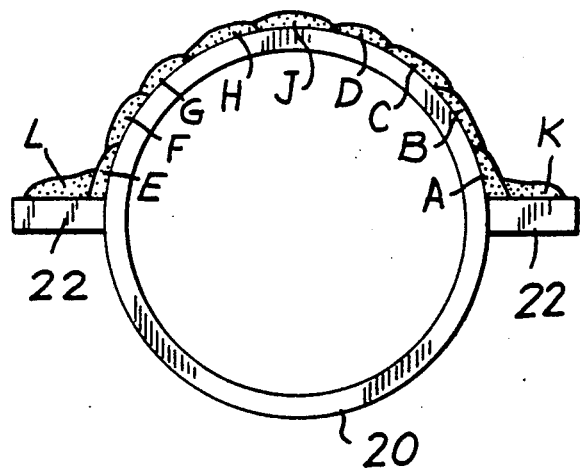
FIG. 5 shows a weld pattern used for metal cladding the outer surface of the tubes and fins.

To minimize or prevent distortion of the tubes 20 caused by such welding, each of the tubes 20 is cooled during the welding operation by passing a cooling fluid such as water through the tube. To accomplish such cooling, an adapter plug 24 surrounded by annular seal 25 is inserted into each end of the tube 20 to control the flow of water through the tube, is generally shown by FIG. 4. A valved connection 26 for water supply is provided/connect to one adapter plug 24, and outlet 27 is connected to the plug 24 at the other end of the tube 20. Also, if desired, an air connection 28 can be provided at the tube inlet end to help dry the interior of tube 20 after welding. The desired final weld sequence and pattern for each tube to minimize distortions is shown by FIG. 5. It is noted that this weld sequence enables each weld bead, A–L to be successively covered at least partially by the later applied weld bead.

Cladding metals which are useful in this invention include chromium and nickel alloys, such as Inconel 625. Because the welding procedures used for metal cladding operations are generally known in the art, as described in U.S. Pat. No. 2,755,369 to Shrubsall which is incorporated herein by reference, such welding procedures will not be described in detail.

This invention will be further described by the following Example, which should not be construed as limiting in scope.

EXAMPLE

An elongated rotatable welding fixture is provided which is constructed using a bundle of 9 adjacent elongated tubes, each tube being 12 inches square by 0.050 inches thick and 20 feet long and welded together in a parallel pattern having a square cross-sectional shape. An end plate and trunnion are welded onto each end of the square tubes in alignment with the central horizontal axis of the tube bundle. Surrounding the welding fixture are 36 finned tubes being provided, with 9 tubes on each side all rigidly supported by the fixture. Each tube is 3 inch diameter and has two 0.50 inch wide elongated fins provided on each side of the tube.

The outer surface of the tubes and fins weld clad are/cooled by water at 50–60 degrees F. flowing through the tube, while each tube and fin are weld clad on their outer surface with a layer of Inconel 625 alloy metal, a corrosion resistant chromium-nickel alloy material. The cladding layer is provided in multiple overlapping beads. The resulting weld clad tubular panels are then removed from the welding fixture.

It will be understood that modifications and variations can be made to this invention, which is defined by the following claims.

I claim:

1. A rotatable welding fixture adapted for welding operations on elongated structures supported by the fixture, comprising:

(a) an elongated rigid central frame, said frame being provided by a plurality of adjacent rectangular-shaped tubes rigidly attached together and having at least one outer surface and having an end plate rigidly attached to each end of the frame so as to substantially cover each end of the frame;

(b) a cylindrical-shaped trunnion rigidly attached onto the outer side of each said end plate, said trunnions being in alignment with the longitudinal axis of said central frame, whereby the fixture can be rotated about its central longitudinal axis for performing welding operations on an elongated structure located around and rigidly supported by the welding fixture.

2. A rotatable welding fixture according to claim 1, wherein said outer surface is planar.

3. A rotatable welding fixture according to claim 1, wherein said outer surface is curvilinear.

4. A rotatable welding fixture according to claim 1, wherein said frame consists of from 4 to 16 square-shaped tubes.

5. A rotatable welding fixture according to claim 1, including in combination a plurality of elongated structures supportably attached around the outer surface of said elongated central frame, said elongated structure being rigidly supported by said central frame during welding operation on the structures.

6. A rotatable welding fixture according to claim 5, wherein said elongated structures are a plurality of adjacent longitudinally finned tubes.

7. A rotatable welding fixture according to claim 5, wherein at least two finned tubes are provided on each of four outer sides of the welding fixture to form a tubular panel wall, each said panel wall being connected to an adjacent panel wall by a connecting plate.

8. A rotatable welding fixture according to claim 5, including means for passing a cooling liquid through said tubes to cool the tubes during welding operations performed on the tubes.

9. A welding fixture rotatable about its longitudinal axis and adapted for welding operations on an elongated structure supported by the fixture, comprising:
(a) an elongated central rigid frame formed of a plurality of rectangular-shaped tubes rigidly attached together, said frame having a planar outer surface and an end plate welded onto each end of the frame;
(b) a cylindrical-shaped trunnion rigidly attached onto the outer side of each said end plate, said trunnion being in alignment with the longitudinal axis of said central frame;
(c) means for supportably attached a plurality of adjacent elongated tubes around the outer surface of said central rigid frame; and
(d) means for passing a cooling liquid through said elongated tubes to cool the tubes during welding operations on the tubes, whereby the fixture can be rotated about its longitudinal axis while performing metal clad welding operations on the outer surface of the elongated tubes while being rigidly supported by the welding fixture.

10. A method for weld metal cladding an elongated tubular structure rigidly supported by a welding fixture, comprising:
(a) providing an elongated rigid welding fixture rotatable about its longitudinal axis, said fixture having a rectangular cross-sectional shape;
(b) providing four elongated tubular panel structures and placing said panel structures on the outer longitudinal surfaces of said welding fixture, each said tubular panel structure including a plurality of adjacent longitudinally finned tubes connected together;
(c) welding successive metal cladding beads onto the outer surface of the tubular panel structure; and
(d) removing the welded panel structure from the welding fixture.

11. A method for weld metal cladding an elongated structure supported by a welding fixture, comprising:
(a) providing an elongated rigid welding fixture rotatable about its longitudinal axis, said fixture having at least one planar outer surface;
(b) providing a plurality of elongated structures attached onto the other longitudinal surface of said welding fixture; and
(c) welding successive metal cladding beads onto the outer surface of the structure.

12. The method of claim 11, wherein the elongated structure being welded is a plurality of adjacent finned tubes arranged in a tubular panel.

13. The method of claim 11, wherein a tubular panel is attached to each of four longitudinal sides of said welding fixture, each adjacent panel being connected together by a connecting plate.

14. The method of claim 12, including passing a cooling liquid through the tubes of said panel.

15. The method of claim 11, wherein the weld cladding metal include chromium alloys, and nickel alloy.

16. The method of claim 11, including removing the planar welded panel from the welding fixture.

* * * * *